(12) United States Patent
Carmi (10) Patent No.: US 10,546,370 B2
(45) Date of Patent: Jan. 28, 2020

(54) VISUALIZATION OF SPECTRAL IMAGE DATA

(71) Applicant: KONINKLIJKE PHILIPS N.V., Eindhoven (NL)

(72) Inventor: Raz Carmi, Haifa (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 51 days.

(21) Appl. No.: 15/503,427

(22) PCT Filed: Sep. 4, 2015

(86) PCT No.: PCT/IB2015/056765
§ 371 (c)(1),
(2) Date: Feb. 13, 2017

(87) PCT Pub. No.: WO2016/035048
PCT Pub. Date: Mar. 10, 2016

(65) Prior Publication Data
US 2017/0228857 A1    Aug. 10, 2017

Related U.S. Application Data

(60) Provisional application No. 62/046,472, filed on Sep. 5, 2014.

(51) Int. Cl.
*G06T 7/00*  (2017.01)
*G06T 5/50*  (2006.01)

(52) U.S. Cl.
CPC .............. *G06T 5/50* (2013.01); *G06T 7/0012* (2013.01); *G06T 2207/10081* (2013.01); *G06T 2207/20221* (2013.01)

(58) Field of Classification Search
CPC ......... A61B 6/037; A61B 5/055; A61B 6/032; A61B 2090/365; A61B 6/5247;
(Continued)

(56) References Cited

U.S. PATENT DOCUMENTS 5,187,658 A * 2/1993 Cline ................... G16H 50/50
382/128
6,628,983 B1 * 9/2003 Gagnon ................ G01T 1/1648
600/431
(Continued)

FOREIGN PATENT DOCUMENTS

WO    2010/084390    7/2010

OTHER PUBLICATIONS

Kovesi, et al., "Interactive multi-image blending for visualization and interpretation", Computers and Geosciences, vol. 72, Jul. 21, 2014.

(Continued)

*Primary Examiner* — Matthew C Bella
*Assistant Examiner* — Dennis Rosario
(74) *Attorney, Agent, or Firm* — Larry Liberchuk (57) ABSTRACT

A method includes combining a plurality of different types of spectral images into a first single blended image based on a first blend point of a first spectral image data blend map. The first blend point includes a first set of weight values. The first set of weight values includes a weight value for each of the plurality of different types of spectral images. The plurality of different types of spectral images is combined based on the first set of weight values. The method further comprising displaying the first single blended image via a display device.

20 Claims, 5 Drawing Sheets

(58) Field of Classification Search
CPC ......... G06T 7/0012; G06T 2207/10072; G06T 2207/10081; G06T 2207/20221; G06T 2207/30004; G06T 2207/10104; G06T 11/60; G06T 19/006; G06T 11/001; G06T 2200/24; G06F 3/04842; H04N 5/265; H04N 5/262
See application file for complete search history.

(56) References Cited

U.S. PATENT DOCUMENTS

| | | | |
|---|---|---|---|
| 6,923,950 B2* | 8/2005 | Salb | A61B 6/4035 424/1.11 |
| 8,090,429 B2* | 1/2012 | Vija | A61B 6/00 382/282 |
| 8,115,784 B2 | 2/2012 | Licato | |
| 8,712,128 B2* | 4/2014 | Eusemann | G06T 11/00 382/128 |
| 8,976,264 B2* | 3/2015 | Rivard | H04N 5/2354 348/223.1 |
| 9,042,512 B2* | 5/2015 | Yin | A61B 6/032 250/370.09 |
| 9,491,443 B2* | 11/2016 | Oikawa | G06T 15/08 |
| 2009/0028287 A1 | 1/2009 | Krauss | |
| 2009/0052727 A1 | 2/2009 | Eusemann | |
| 2009/0244098 A1* | 10/2009 | Tateishi | G06T 3/0093 345/646 |
| 2010/0131885 A1 | 5/2010 | Licato | |
| 2010/0166273 A1 | 7/2010 | Wismueller | |
| 2010/0310036 A1 | 12/2010 | Burleton | |
| 2013/0120453 A1 | 5/2013 | Carmi | |

OTHER PUBLICATIONS

Rehfeld, et al., "Single and dual energy attenuation correction in PET/CT in the presence of iodine based contrast agents", Medical Physics, vol. 35, No. 5, Apr. 24, 2008.
Ratib, et al., "PET/CT Image Navigation and Communication", The Journal of Nuclear Medicine, vol. 45, No. 1, Jan. 1, 2004.
Holmes, et al., "Evaluation of non-linear blending in dual-energy computed tomography", European Journal of Radiology, vol. 68, Issue 3, pp. 409-413, Dec. 2008.
Kramer, et al., "Multi-energy image stack fusion in computed tomography", Meas. Sci. Technol. 21 (2010) 045105.

* cited by examiner

VISUALIZATION OF SPECTRAL IMAGE DATA

CROSS REFERENCE TO RELATED APPLICATIONS

This application is the U.S. National Phase application under 35 U.S.C. § 371 of International Application No. PCT/IB2015/056765, filed Sep. 4, 2015, published as WO 2016/035048 on Mar. 10, 2016, which claims the benefit of U.S. Provisional Patent Application No. 62/046,472 filed Sep. 5, 2014. These applications are hereby incorporated by reference herein.

The following generally relates to visualization of spectral image data, and is described with particular application to computed tomography (CT).

Spectral (or multi-energy) CT can be implemented in several different ways. For example, one implementation includes a scanner with multiple x-ray tubes. Another implementation includes a scanner configured with kVp switching. Another implementation employs multi-layer detectors. Another implementation employs photon counting detectors. Another implementation includes combination of one or more of the above. Such implementation can provide several different types of volumetric information.

For instance, the image data can include wide spectrum attenuation values (i.e. conventional CT), attenuation values in different x-ray energy bands, and virtual monochromatic images. Where a contrast agent is used (e.g. iodine or gadolinium), a contrast agent quantitative map and virtual non-contrast (VNC) images can be derived. The contrast agent quantitative map can show, e.g., the local concentration of iodine in mg/ml. The VNC image shows a virtual (calculated) image which resembles a conventional CT image without administration of a contrast agent.

Another approach calculates a volumetric Z-effective map, which estimates a mean atomic number of the material compound in each image voxel. Another approach generates volumetric maps for additional materials such as calcium, uric-acid, iron compounds, and several types of targeted contrast agents. Another approach generates volumetric maps such as perfusion maps, texture analysis maps, and computer aided decision (CAD) results.

For clinical visualization, it is common to show, in grayscale, the image data types which resemble an anatomical CT image. In this way, the user can perceive the image in a standard way. The other image data sets, which represent quantitative material values or functional analysis, are usually shown using appropriate color maps. Combinations of different image types can be done, for example, by standard image fusion or by more advanced techniques and combinations.

In addition, a physician may desire to view more than one grayscale image. A common example is reviewing a scanned volume both with and without contrast agent. When spectral CT is used, the VNC image can replace the non-contrast scan and save radiation dose and clinical workflow burden. In spectral CT, it is also common to enable continuous selection between different virtual monochromatic grayscale images calculated in different energies, or to enable the display of different energy-band images.

Conventional visualization techniques fuse selected layers with interactive switching between different image layers in a selected region or present different information layers side-by-side. Unfortunately, such techniques may not be well suited for review of multiple information layers, due, for example, to the practical complications in simultaneous clinical reviewing of multiple information layers. As such, there is an unresolved need for improved techniques for making such tasks more efficient and/or easy to use.

Aspects described herein address the above-referenced problems and others.

The following describes an interactive visualization approach for efficient viewing of multiple spectral CT volumetric information types. As an example, a user can continuously deform, using a single interactive blend point parameter, a multi-blended image to vary the displayed image from a first type of image to a second different type of image through a plurality of different blended intermediate images, which are overlaid with a varying semi-transparent overlay. In one instance, this allows an observer to not lose a focus or perception of structure of interest while viewing different energy dependent properties.

In one aspect, a method includes combining a plurality of different types of spectral images into a first single blended image based on a first blend point of a first spectral image data blend map. The first blend point includes a first set of weight values. The first set of weight values includes a weight value for each of the plurality of different types of spectral images. The plurality of different types of spectral images is combined based on the first set of weight values. The method further comprising displaying the first single blended image via a display device.

In another aspect, a computing system includes a memory that stores instructions of a spectral data visualization module, and a processor that receives a signal indicating a spectral image data blend map; retrieves a sub-set of different types of spectral images corresponding to the spectral image data blend map; combines the retrieved sub-set of different types of spectral images based on a first blending of the spectral image data blend map creating a first single image; and visually presents the first single image.

In another aspect, a computer readable storage medium is encoded with computer readable instructions. The computer readable instructions, when executed by a processer, cause the processor to: vary a displayed spectral image from a first type of spectral image to a second different type of image through a plurality of different blended intermediate spectral images.

The invention may take form in various components and arrangements of components, and in various steps and arrangements of steps. The drawings are only for purposes of illustrating the preferred embodiments and are not to be construed as limiting the invention.

Figure 1:
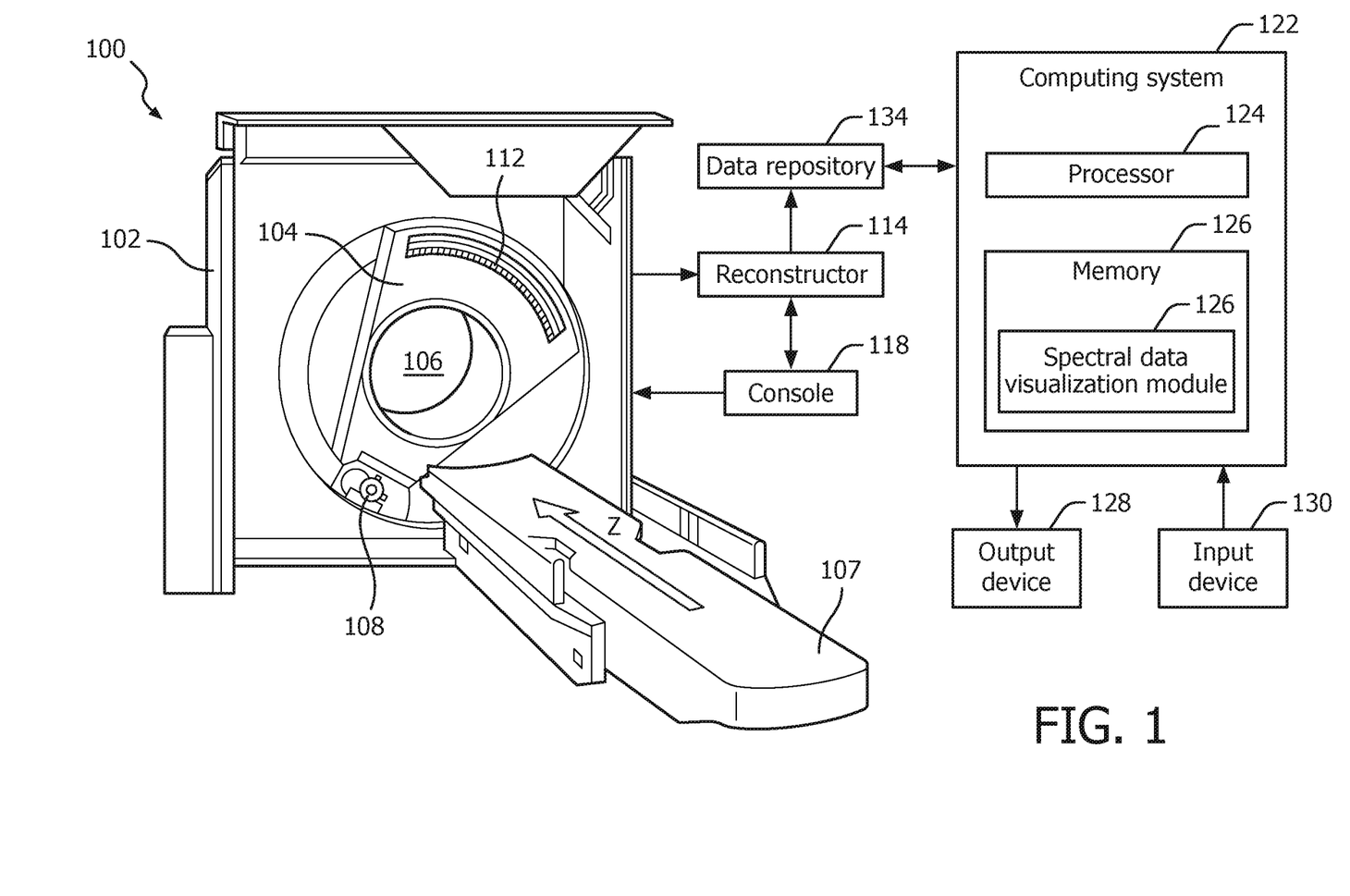
FIG. 1 schematically illustrates an example computing system, with a spectral data visualization module, in connection with an imaging system.

Initially referring to FIG. 1, an imaging system 100, such as a computed tomography (CT) scanner, is illustrated. The imaging system 100 includes a generally stationary gantry 102 and a rotating gantry 104, which is rotatably supported by the stationary gantry 102 and rotates around an examination region 106 about a z-axis. A subject support 107 such as a couch supports a subject or object in the examination region 106. The subject support 107 is movable in coordination with scanning so as to guide the subject or object with respect to the examination region 106 for scan of the subject or object.

A radiation source 108, such as an x-ray tube, is rotatably supported by the rotating gantry 104, rotates with the rotating gantry 104, and emits radiation that traverses the examination region 106. In one instance, a controller controls a mean or peak emission voltage of the radiation source 108. This includes switching the emission voltage between two or more emission voltages (e.g., 80 and 140 kVp, 100 and 120 kVp, etc.) within an integration period and/or otherwise. In a variation, the imaging system 100 includes at least two radiation sources 108 that emit radiation at different emission voltages. In another variation, the radiation source 108 includes a single broad spectrum x-ray tube.

A detector array 112 subtends an angular arc opposite the examination region 106 relative to the radiation source 108. The detector array 112 detects radiation that traverses the examination region 106 and generates projection data indicative thereof. Where the radiation source voltage is switched between at least two emission voltages and/or includes two or more x-ray tubes emit radiation at two different emission voltages, the detector array 112 generates projection data for each of the radiation source voltages. For a single broad spectrum x-ray tube, the detector array 112 includes an energy-resolving detector (e.g., multi-layered, photon counting, etc.) that produces spectral projection data.

A reconstructor 114 reconstructs the projection data, generating volumetric image data. Examples of the image data and/or image data derived therefrom include, but are not limited to, conventional (non-spectral) image data based on wide spectrum attenuation values, different x-ray energy band image data, virtual monochromatic image data, contrast agent quantitative image data, virtual non-contrast (VNC) image data, volumetric Z-effective image data, calcium volumetric image data, uric-acid volumetric image data, iron compound volumetric image data, targeted contrast agent volumetric image data, perfusion image data, texture analysis image data, etc.

A computing system 122 includes at least one processor 124 (e.g., a microprocessor, a central processing unit, etc.) that executes at least one computer readable instruction stored in computer readable storage medium ("memory") 126, which excludes transitory medium and includes physical memory and/or other non-transitory medium. The microprocessor 124 may also execute one or more computer readable instructions carried by a carrier wave, a signal or other transitory medium. The computing system 122 further includes an output device(s) 128 such as a display monitor, a filmer, etc., and an input device(s) 130 such as a mouse, keyboard, etc.

The instruction, in this example, includes a spectral data visualization module 132. As described in greater detail below, the spectral data visualization module 132, in one instance, visually displays, in a user-interactive graphical user interface (GUI), a set of differently blended spectral image types. For example, the spectral data visualization module 132 can display a user selected one of a series of blended spectral image types, which ranges from one type of spectral image to another type of spectral image, through a plurality of intermediate differently blended spectral image types. Switching from one blended image to another can be through a single blend point parameter. The display may also include superimposing a semi-transparent image overlay over the intermediate images using a transparency level that differs between at least two of the intermediate images. In one instance, this allows for efficient and/or easy to use visualization of spectral image data.

The illustrated computing system 122 processes image data obtained from a data repository 134. Examples of data repositories include a picture archiving and communication system (PACS), a radiology information system (RIS), a hospital information system (HIS), an electronic medical record (EMR), a database, a server, an imaging system, a computer and/or other data repository. The data can be transferred via Digital Imaging and Communications in Medicine (DICOM), Health Level 7 (HL7), and/or other protocols. In a variation, the image data can be obtained from the imaging system 100 and/or other imaging system.

Figure 2:
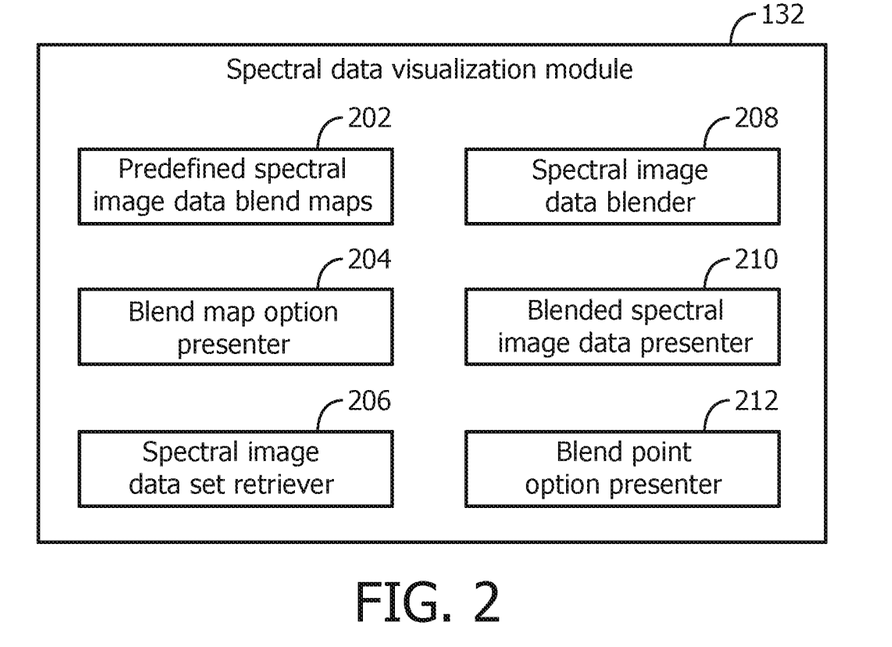
FIG. 2 schematically illustrates an example of the spectral data visualization module.

FIG. 2 schematically illustrates an example of the spectral data visualization module 132.

The spectral data visualization module 132 includes a plurality of spectral image data blend maps 202. Each of the spectral image data blend maps 202 defines a different blending scheme for a same or different combination of spectral image data. The spectral image data blend maps 202 can be default, user defined, etc. Each blend scheme includes at least two different blend point parameters, each defining a different blending contribution of the different spectral image data types. A blend map 202 can be independent of other visualization parameters such as window/level, transparency, color map, etc.

The example spectral data visualization module 132 further includes a blend map option presenter 204. The blend map option presenter 204 visually presents, in a GUI presented in a display monitor output device 128, a list of available spectral image data blend maps, in which the list is based on the plurality of spectral image data blend maps 202. The list, in one instance, is visually presented as input device (e.g., mouse) selectable graphical indicia (e.g., an icon, text, a picture, etc.) in a menu such as a pop up, drop down, list, etc. menu.

The example spectral data visualization module 132 further includes a spectral image data set retriever 206. The spectral image data set retriever 206, in response to receiving an input signal (e.g., via the input device 130 and/or otherwise) indicative of a user, default, protocol, etc. selected spectral image blend map of interest from the list, retrieves two or more sets of different image data types from the data repository 134 and/or other storage, based on the selected blend map of interest.

The example spectral data visualization module 132 further includes a spectral image data blender 208. The spectral image data blender 208 combines different spectral image types and generates a series of blended images, based on the retrieved different image data types and the selected spectral image blend map. The blending for a particular image data type can range from zero percent contribution to 100% contribution, with the total contribution from the blended image data types equal to 100%. Generally, images blended as such represent structural information.

The blending for a particular image data type may alternatively correspond to a transparency level for an image overlay that is superimposed over a blended image. Such an image may represent functional or quantitative data. This data can be shown with colors. This data may also have some appearance on part of the blended grayscale image range, and may have less or no appearance on another range part. In such an instance, this data can be presented so that a maximum semi-transparent color intensity appears where the blended grayscale image has the less appearance of the functional or quantitative information.

The example spectral data visualization module 132 further includes a blended spectral image data presenter 210. The blended spectral image data presenter 210 visually presents, via a display monitor output device 128, one or more of the blended spectral images. In one instance, all of the blended spectral images are concurrently visually presented. In another instance, less than all (e.g., one at a time, two at a time, etc.) of the blended spectral images are visually presented.

The example spectral data visualization module 132 further includes a blend point option presenter 212. The blend map option presenter 204 visually presents, in a GUI presented in a display monitor output device 128, a list of the blend points for the selected blend map. This may include graphically and/or numerically indicating the particular blend at each blend point, indicating the currently displayed blend point, providing a way to switch to another blend point, etc.

The following describes a particular non-limiting example of the above in which three different image data set types (virtual non-contrast image, iodine only image and conventional contrast image) are blended.

Figure 3:
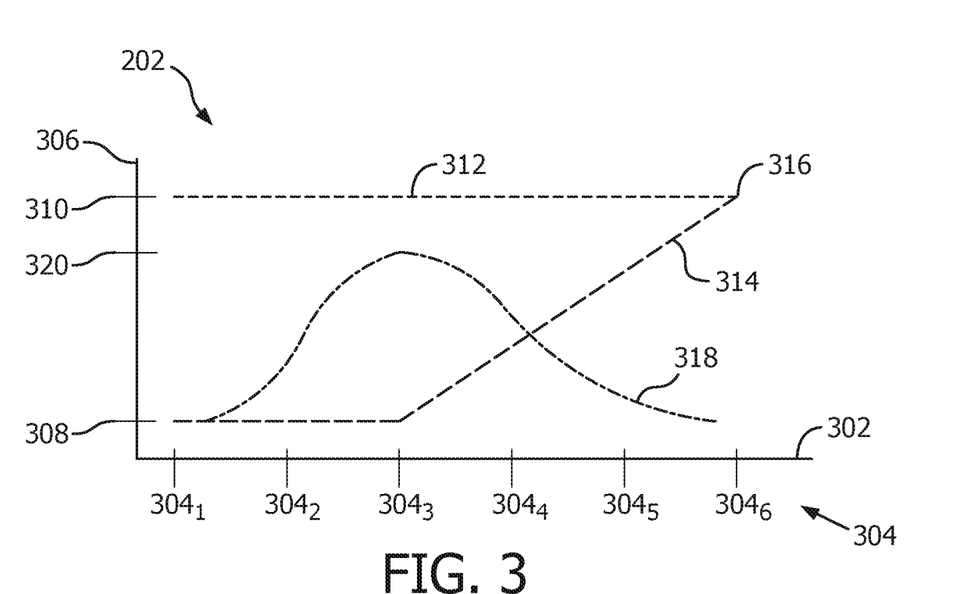
FIG. 3 shows an example spectral image data blend map of the spectral data visualization module.
Figure 4A:
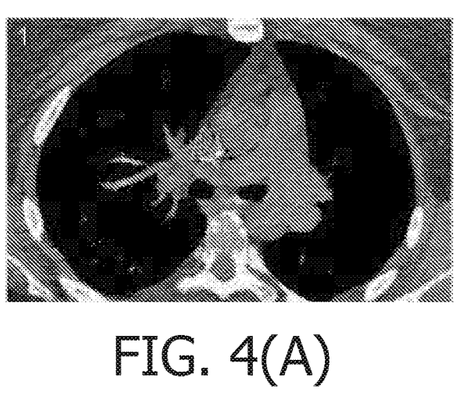
FIG. 4(A) shows a first example blend of a virtual non-contrast image, a conventional contrast image, and an iodine only image.
Figure 4B:
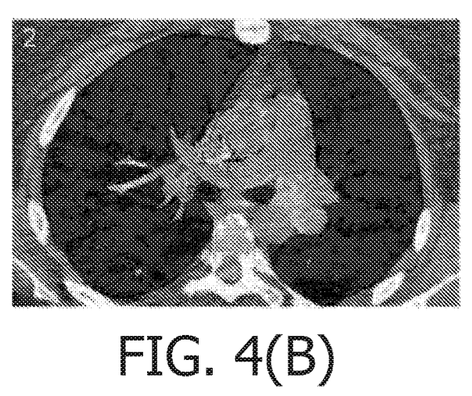
FIG. 4(B) shows a second example blend of the virtual non-contrast image, the conventional contrast image, and the iodine only image.
Figure 4C:
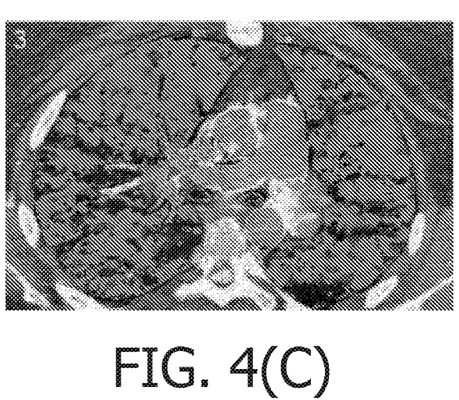
FIG. 4(C) shows a third example blend map of the virtual non-contrast image, the conventional contrast image, and the iodine only image.
Figure 4D:
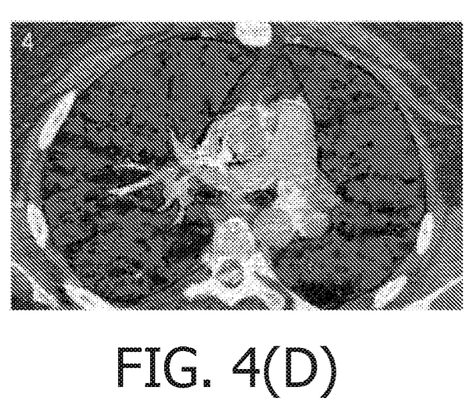
FIG. 4(D) shows a fourth example blend map of the virtual non-contrast image, the conventional contrast image, and the iodine only image.
Figure 4E:
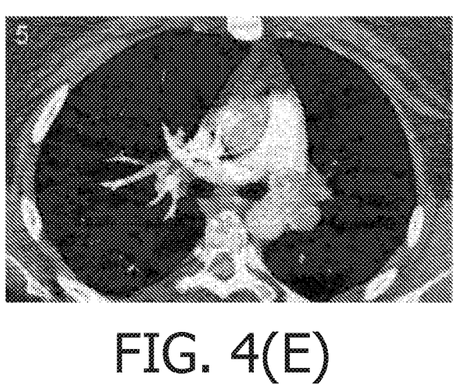
FIG. 4(E) shows a fifth example blend map of the virtual non-contrast image, the conventional contrast image, and the iodine only image.
Figure 4F:
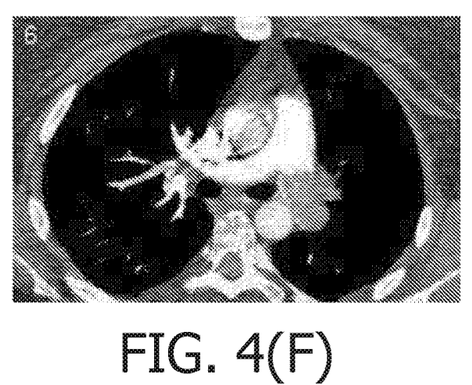
FIG. 4(F) shows a sixth example blend map of the virtual non-contrast image, the conventional contrast image, and the iodine only image.

FIG. 3 shows an example spectral image data blend map 202. An x-axis 302 represents different blend points 304. In this example, there are six different blend points, $304_1, \ldots, 304_6$. A y-axis 306 represents a relative weight, ranging from a minimum 308 (e.g., zero (0)) to a maximum 310 (e.g., one (1)). In other example, there can be more or less blend points.

A first curve 312 represents a first weight for the virtual non-contrast image as a function of the different blend points 304. In this example, the first weight is always the maximum 310.

A second curve 314 represents a second weight that scales the iodine only image, to be additively combined with the virtual non-contrast image, up to the conventional contrast image 316 as a function of the different blend points 304. In this example, the second weight is the minimum 308 from the first blend point $304_1$ to the third blend point $304_3$, the maximum at the sixth blend point $304_6$, and linearly increases from the minimum to the maximum there between. The scaling of the iodine only image data scales the data to the correct HU scale, which preserves the meaningful interpretation of the contrast agent distribution.

A third curve 318 represents a third weight for the visualization representation (e.g. color-map transparency) of the iodine only image as a function of the different blend points. In this example, the third weight is generally bell-like shaped with a peak of the bell at a weight 320, which is between the minimum 308 and the maximum 310.

It is to be understood that the above-described weights are non-limiting and provided for explanatory purposes, and that other weights are also contemplated herein.

FIG. 4 shows an example blended image for each of the blend points of the spectral image data blend map 202 of FIG. 3. FIG. 4(A) shows an image for blend point 1, FIG. 4(B) shows an image for blend point 2, FIG. 4(C) shows an image for blend point 3, FIG. 4(D) shows an image for blend point 4, FIG. 4(E) shows an image for blend point 5, and FIG. 4(F) shows an image for blend point 6.

In this example, the virtual non-contrast image, the iodine only image and the conventional contrast image are represented using Hounsfield Units in gray scale values. The overlay quantitative iodine only image is also represented here in grayscale. However, it is to be understood that other visualization is contemplated herein. For example, the quantitative iodine only image data, which quantifies the amount of pure iodine in each voxel, can alternatively be represented in a semi-transparent color map.

In one instance, the spectral image data blend map 202 of FIG. 3 is displayed along with the blended spectral image data. In this instance, the displayed spectral image data blend map may the blend point option presented 212. As such, a user can simply click on a blend point of interest to visualize an image corresponding to the particular blend point.

Through the selectable dedicated blend points, the user can change the image from a virtual non-contrast image to a conventional contrast CT image, through a blend of virtual non-contrast image, conventional contrast CT image and fused iodine only image data. By gradually changing the displayed image as such, the observer does not lose the focus and the perception of the relevant structure under evaluation, while appreciating the different properties.

Figure 5:
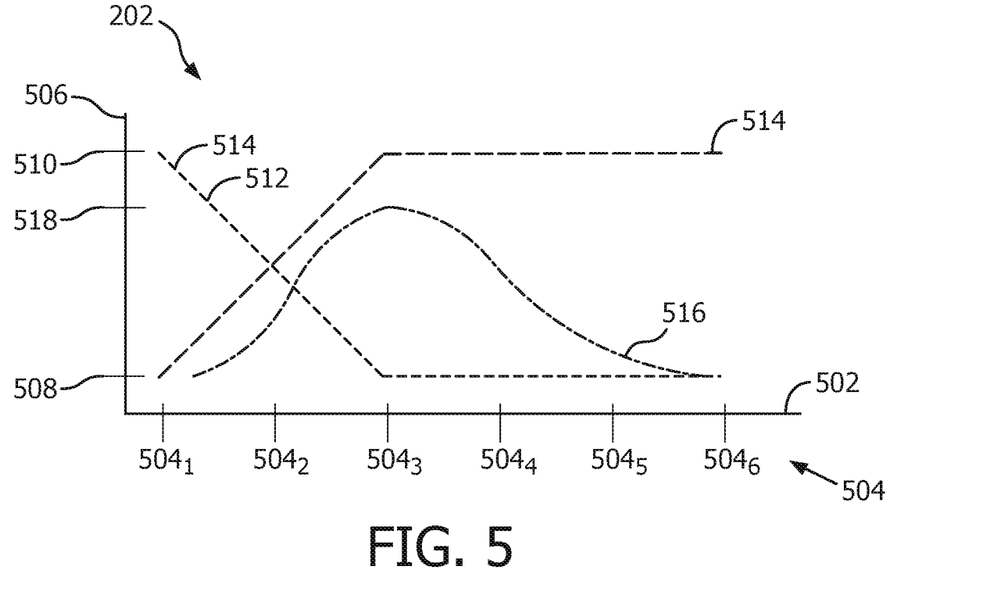
FIG. 5 shows example spectral image data blend map for a low-energy image, a conventional contrast image, and an iodine only image.

FIG. 5 shows example spectral image data blend map for a low-energy image, a conventional contrast image, and an iodine only image.

An x-axis 502 represents different blend points 504. In this example, there are six different blend points, $504_1, \ldots, 504_6$. A y-axis 506 represents a relative weight, ranging from a minimum 508 (e.g., zero (0)) to a maximum 510 (e.g., one (1)). In other example, there can be more or less blend points.

A first curve 512 represents a first weight that scales a low energy image 514 as a function of the different blend points 504. In this example, the first weight is the maximum 510 at the first blend point $504_1$ and the minimum 508 at the third blend point $504_3$ and thereafter.

A second curve 514 represents a second weight that scales a conventional contrast image as a function of the different blend points 504. In this example, the second weight is the minimum 508 at the first blend point $504_1$ and linearly increases to the maximum 510 at the third blend point $504_3$ and thereafter.

A third curve 516 represents a third weight for the transparency of the iodine only image as a function of the different blend points. In this example, the third weight is generally bell-like shaped with a peak of the bell at a weight 520, which is between the minimum 508 and the maximum 510.

With this option, the grayscale starts from a virtual monochromatic image in a pre-selected low energy and continuously transforms to the conventional CT image. The fused scale represents the iodine map or another quantitative map. The weights are designed to enable continuous views of the monochromatic low energy, to conventional CT with fused quantitative map, to conventional CT image alone.

Figure 6:
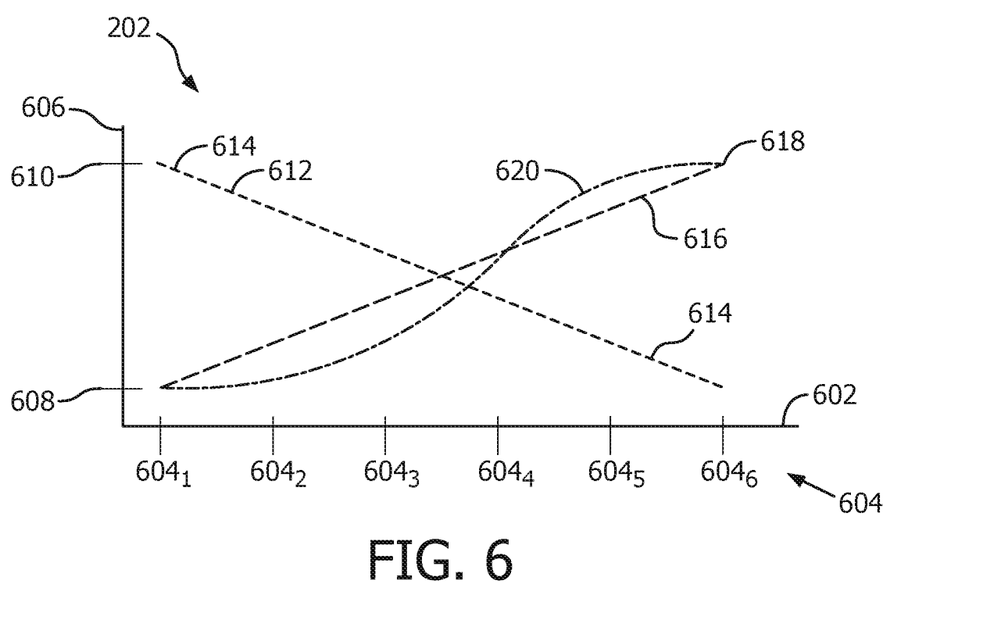
FIG. 6 shows example spectral image data blend map for a low-energy image, a high energy image, and an iodine only image.

FIG. 6 shows example spectral image data blend map for a low-energy image, a high energy image, and an iodine only image.

An x-axis 602 represents different blend points 604. In this example, there are six different blend points, $604_1, \ldots, 604_6$. A y-axis 606 represents a relative weight, ranging from a minimum 608 (e.g., zero (0)) to a maximum 610 (e.g., one (1)). In other example, there can be more or less blend points.

A first curve 612 represents a first weight that scales a low energy image 614 as a function of the different blend points 604. In this example, the first weight is the maximum 610 at the first blend point $604_1$ and the minimum 608 at the sixth blend point $604_3$ and thereafter.

A second curve 616 represents a second weight that scales a high energy image 618 as a function of the different blend points 604. In this example, the first weight is the minimum 610 at the first blend point $604_1$ and the maximum 608 at the sixth blend point $604_3$ and thereafter.

A third curve 620 represents a third weight for the transparency of the iodine only image as a function of the different blend points. In this example, the third weight is "S" shaped from blend point one $604_1$ to blend point six $604_6$.

This example combines the continuous shift between different monochromatic images with a quantitative map overlay which gets its maximum while combined with the high-energy monochromatic image.

Note that in the above examples the indicated iodine map curve, intended for color overlay, can be replaced with other functional or quantitative data types such as: spectral CT Z-effective map, dynamic contrast enhanced CT perfusion maps, CT texture analysis maps, spectral CT targeted contrast agent maps, spectral CT uric-acid map and others.

Figure 7:
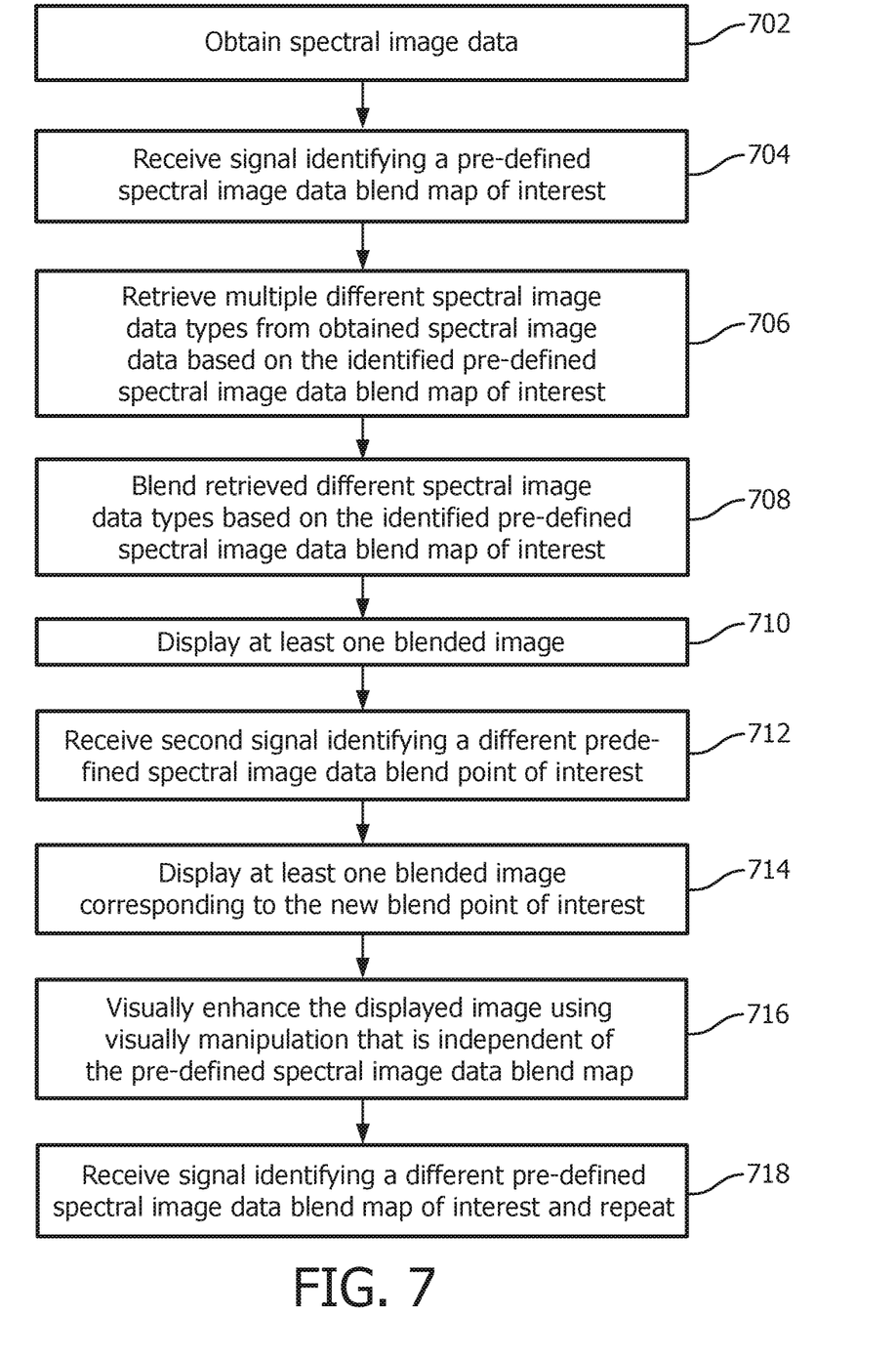
FIG. 7 illustrates an example method for visualizing spectral image data.

FIG. 7 illustrates an example method for visualizing spectral image data.

It is to be appreciated that the ordering of the acts is not limiting. As such, other orderings are contemplated herein. In addition, one or more acts may be omitted and/or one or more additional acts may be included.

At 702, spectral image data of a patient is obtained. As described herein, the spectral image data include reconstructed spectral image data and/or volumetric sets derived therefrom and/or simulated. The spectral image data can be from the same scan or different scans of the patient.

At 704, a signal identifying a pre-defined spectral image data blend map of interest is received. As discussed herein, each map includes its own combination of image data types, and each image data type includes multiple blend points, each with its own set of weights.

At 706, multiple different spectral image data types are retrieved from the obtained spectral image data based on the identified pre-defined spectral image data blend map.

At 708, the retrieved multiple different spectral image data types are blended according to the selected pre-defined spectral image data blend map. If needed, the image data sets are spatially registered by an image registration algorithm, for example, where the different image data sets are from different scans.

At 710, at least one blended image corresponding to at least one of the blend points is visually displayed. The particular image to display can be based on a default, a user preference, the imaging protocol, etc.

At 712, a second signal indicating a different blend point of interest is received. In one instance, this can be achieved through a predetermined mouse movement, keyboard arrows, a slider presented on the screen, typing a number in a text box, etc.

At 714, at least one blended image corresponding to the new blend point of interest is visually displayed.

Acts 712/714 can be repeated during viewing.

At 716, optionally, the displayed blended image can be visually enhanced through manipulation that is independent of the blend map.

At 718, optionally, a third signal identifying a different pre-defined spectral image data blend map of interested is received, and at least acts 706-710 are repeated.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
    receiving, via an input device, a first signal indicative of a first user selection of a first blend point of a first spectral image data blend map;
    combining a plurality of different types of spectral images into a first single blended image based on the first blend point of the first spectral image data blend map,
    wherein the first blend point includes a first set of weight values, the first set of weight values includes a weight value for each of the plurality of different types of spectral images, and the plurality of different types of spectral images is combined based on the first set of weight values; and
    displaying the first single blended image via a display device.

2. The method of claim 1, further comprising:
    combining the same plurality of different types of spectral images into a second single blended image based on a second blend point of the first spectral image data blend map,
    wherein the second blend point includes a second set of weight values, the second set of weight values includes a weight value for each of the plurality of different types of spectral images, the first and second sets of weight values are different, and the plurality of different types of spectral images are combined based on the second set of weight values; and
    displaying the second single blended image via the display device.

3. The method of claim 2, further comprising:
    displaying the second single blended image corresponding to the selection.

4. The method of claim 1, further comprising:
    displaying the first single blended image corresponding to the second selection.

5. The method of claim 2, wherein one of the plurality of different types of spectral images is a functional image representing functional information, and the blending comprising:
superimposing the functional image over a blend of at least two of a plurality of different types of spectral images.

6. The method of claim 5, further comprising:
superimposing the functional image based on a transparency level.

7. The method of claim 6, further comprising:
using a first transparency level for the first blend point; and
using a second different transparency level for the second blend point.

8. The method of claim 6, further comprising:
superimposing the functional image data type as a semi-transparent color overlay.

9. The method of claim 6, further comprising:
blending at least two spectral images representing structural information to create the blend of the at least two of plurality of different types of spectral images.

10. The method of claim 1, further comprising:
retrieving, based on the first spectral image data blend map, the plurality of different types of spectral images from a data repository storing spectral images, wherein the plurality of different types of spectral images is a sub-set of the spectral images in the repository of spectral images.

11. The method of claim 1, further comprising:
receiving an input indicative of a selection of a second different spectral image data blend map;
combining a different plurality of different types of spectral images into a third single blended image based on a first blend point of the second different spectral image data blend map;
combining the different plurality of different types of spectral images into a fourth single blended image based on a second blend point of the second different spectral image data blend map; and
displaying one of the third or fourth single blended image corresponding to the selection of the second different spectral image data blend map.

12. The method of claim 1, further comprising:
visually displaying a graphical representation of the first spectral image data blend map, wherein the graphical representation visually indicates the weight value of each of the plurality of different types of spectral images.

13. The method of claim 1, wherein the plurality of different types of spectral images include two or more of a specific energy band image, a virtual monochromatic image, a contrast agent quantitative image, a virtual non-contrast image, a volumetric Z-effective image, a calcium image, a uric-acid image, an iron compound image, a targeted contrast agent image, a perfusion image, or a texture analysis image.

14. A computing system, comprising:
a memory that stores instructions of a spectral data visualization module; and
at least one processor configured to:
receive, via an input device, a first signal indicative of a first user selection of a first blend point of a first spectral image data blend map;
combine a plurality of different types of spectral images into a first single blended image based on the first blend point of the first spectral image data blend map, wherein the first blend point includes a first set of weight values, the first set of weight values includes a weight value for each of the plurality of different types of spectral images, and the plurality of different types of spectral images is combined based on the first set of weight values; and
display the first single blended image via a display device.

15. The computing system of claim 14, wherein the at least one processor combines the retrieved sub-set of different types of spectral images based on a second blending of the spectral image data blend map creating a second single image; and visually presents the second single image.

16. The computing system of claim 14, wherein the at least one processor superimposes functional image data over the displayed first single image based on a transparency level.

17. The computing system of claim 14, wherein the at least one processor generates a plurality of different blended images, including a first image representing only one of the sub-set of different types of spectral images, a last image representing only a different one of the sub-set of different types of spectral images, and a plurality of intermediate images representing different combinations of the sub-set of different types of spectral images.

18. The computing system of claim 14, wherein the at least one processor retrieves a different sub-set of different types of spectral images corresponding to a different spectral image data blend map; combines the retrieved different sub-set of different types of spectral images based on a first blending of the different spectral image data blend map creating a third single image; and visually presents the third single image.

19. A computer readable storage medium encoded with computer readable instructions, which, when executed by a processer, causes the processor to:
receive a signal indicative of a user selection of a blend point of a spectral image data blend map, wherein the blend point includes a set of weight values that include a weight value for each of a plurality of different types of spectral images,
combine the plurality of different types of spectral images into a single blended image based on the set of weight values of the blend point of the spectral image data blend map; and
display the single blended image via a display device.

20. The computer readable storage medium of claim 19, wherein the computer readable instructions, when executed by the processer, further causes the processor to:
display the spectral image data blend map, wherein the spectral image data blend map includes 3 curves, etc.

* * * * *